US006570528B1

(12) United States Patent
Rao et al.

(10) Patent No.: US 6,570,528 B1
(45) Date of Patent: May 27, 2003

(54) ANTENNA SYSTEM FOR MULTIPLE ORBITS AND MULTIPLE AREAS

(75) Inventors: Sudhakar Rao, Torrance, CA (US); Jack Bauer, Palos Verdes, CA (US); Chih-Chien Hsu, Cherry Hill, NJ (US); Robert Rink, San Diego, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/052,971

(22) Filed: Nov. 9, 2001

(51) Int. Cl.[7] .................................................. H04B 7/185

(52) U.S. Cl. ................... 342/354; 343/914; 343/DIG. 2

(58) Field of Search .......................... 342/354; 343/914, 343/DIG. 2

(56) References Cited

U.S. PATENT DOCUMENTS 5,054,719 A 10/1991 Maute
5,847,681 A * 12/1998 Faherty et al. .............. 343/725
5,936,588 A 8/1999 Rao et al.
6,031,506 A * 2/2000 Cooley et al. .............. 343/840
6,137,451 A * 10/2000 Durvasula et al. .......... 343/835
6,160,520 A 12/2000 Muhlhauser et al.

* cited by examiner

*Primary Examiner*—Theodore M. Blum
(74) *Attorney, Agent, or Firm*—Terje Gudmestad

(57) ABSTRACT

A synthesized reflector surface (12) for directing communication signals (27) in a communication system (10) that operates in a plurality of orbital slots and to a plurality of regions (28) within a first coverage area (30) is provided. The synthesized reflector surface (12) includes a plurality of contiguous profile surfaces (40) that form the reflector surface (12). Each of the plurality of contiguous profile surfaces (40) alters the phase-of the communication signals (27) to provide a first gain for a first satellite orbit location (32) and a second gain for a second satellite orbit location (34). The plurality of contiguous profile surfaces (40) directs the signals from the location (32) in a first orientation to the first coverage area (30) or from the location (34) in a second orientation to the first coverage area (30). A method is provided for synthesizing the reflector surface (12). A satellite system (10) and a method of configuring the satellite system (10) are also provided utilizing the synthesized reflector surface (12).

20 Claims, 9 Drawing Sheets

ANTENNA SYSTEM FOR MULTIPLE ORBITS AND MULTIPLE AREAS

TECHNICAL FIELD

The present invention relates generally to satellite communication systems, and more particularly to an apparatus and method for transmitting and receiving signals from multiple orbit positions that provide service to diverse geographical areas using a single identical reflector.

BACKGROUND OF THE INVENTION

Satellite systems are widely used for various communication services in various locations around the world. Each satellite system is assigned a particular orbital slot based on the specific service, geographical coverage area, power requirements, and other related system requirements and criteria. Satellite systems include multiple antennas each of which having a reflector surface that is designed to transmit and receive communication signals from the assigned orbital slot and for an assigned coverage area. A coverage area may contain multiple regions of coverage. Each region of coverage has different signal requirements including directivity and link availability. Link availability incorporates various signal requirements including gain, rain fade margin, slant range attenuation, cross-polarization interference and discrimination, and clear sky margin requirements for different regions of coverage. Each reflector has a surface that is shaped for maximizing signal transmission from each of the assigned orbital slot to meet or exceed the link availability requirements for all the regions of the assigned coverage area.

Satellite system capability requirements are continuously increasing to accommodate more and more services. In doing so, it has become desirable for a satellite system to have the capability of being used in multiple orbital slots and to provide services for multiple coverage areas. Several factors are considered in developing such a satellite system. One factor is that the satellite system should be designed to provide coverage to the same coverage area from different orbital slots while meeting multiple signal requirements. Transmission beams need to be weighted differently to compensate for the varying rain-fade corresponding to different rain zones within the coverage area. Furthermore, different gains need to be provided for the same location within the coverage area but for the satellite located at different orbit slots in order to compensate for the different rain attentions due to different slant ranges. Slant range refers to the distance the satellite signals must travel through the earth's atmosphere in order to reach the earth based station that it is in communication with. For example, a satellite system located over the west portion of the United States directs signals towards the east portion of the United States will have a shallow elevation angle and require a different gain for its transmitted signals than would a satellite system positioned directly over the east portion of the United States. Moreover, factors such as high level interference from cross-polarized spot beams on a satellite shaped beam, adjacent satellite and adjacent channel interference, self cross-polarization interference, low ground terminal cross-polarization discrimination, and satisfaction of a minimum clear-sky link margin requirements also need to be considered in the design.

In order to achieve all the above-mentioned factors, satellite systems having antennas with multiple reflectors are traditionally required where each reflector is shaped for a specific orbital slot. This limits the number of apertures that can be accommodated on the same satellite system for spot beams and other satellite payloads.

Current satellite systems are also designed to prevent signal interference in the assigned orbital slots and the assigned coverage area, in which case they are not interference limited for multiple service areas.

Therefore, it would be desirable to provide an improved satellite system that uses a single antenna reflector that has the ability to operate in multiple orbits and for multiple coverage areas that are interference limited.

SUMMARY OF THE INVENTION

The foregoing and other advantages are provided by an apparatus and method for transmitting communication signals. A synthesized reflector surface for directing communication signals in a communication system that operates in a plurality of orbital slots and to a plurality of regions within a first coverage area is provided. The synthesized reflector surface includes a plurality of contiguous profile surfaces that form the reflector surface. Each of the plurality of contiguous profile surfaces alters the phase of the communication signals to provide a first gain for a first satellite orbit location and a second gain for a second satellite orbit location. The plurality of contiguous profile surfaces directs the signals from the first satellite orbit location in a first orientation to the first coverage area or from the second satellite orbit location in a second orientation to the first coverage area.

A method is also provided for synthesizing the reflector surface including determining a plurality of orbital slots. Plurality of coverage area(s) are also determined for the plurality of orbital slots. The reflector surface is shaped in response to the plurality of orbital slots and the plurality of coverage areas such that the reflector surface transmits communication signals to a first coverage area from plurality of said plurality of orbital slots. Directivity values of communication signals for the plurality of orbital slots and the coverage areas are calculated. Link availability for the plurality of orbital slots and the coverage areas in response to the computed directivity values are determined. The system determines whether the directivity values and the link availability have been satisfied in the shaped reflector surface.

A satellite system and a method of configuring the satellite system are also provided utilizing the synthesized reflector surface.

One of several advantages of the present invention is that it is flexible in that it may be used in multiple orbits and provides coverage for multiple geographical coverage areas. The flexibility of the present invention allows it to be used for various communication services.

Another advantage of the present invention is that in accounting for different aspects of link availability for multiple regions of coverage, it is capable of operating in an interference-limited environment, which further provides increased flexibility as to operate in multiple orbital slots.

Furthermore, the present invention provides different gains for different regions of coverage area in order to compensate for the difference in the rain attenuation values over the intended coverage on earth.

The present invention itself, together with further objects and attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

Figure 1:
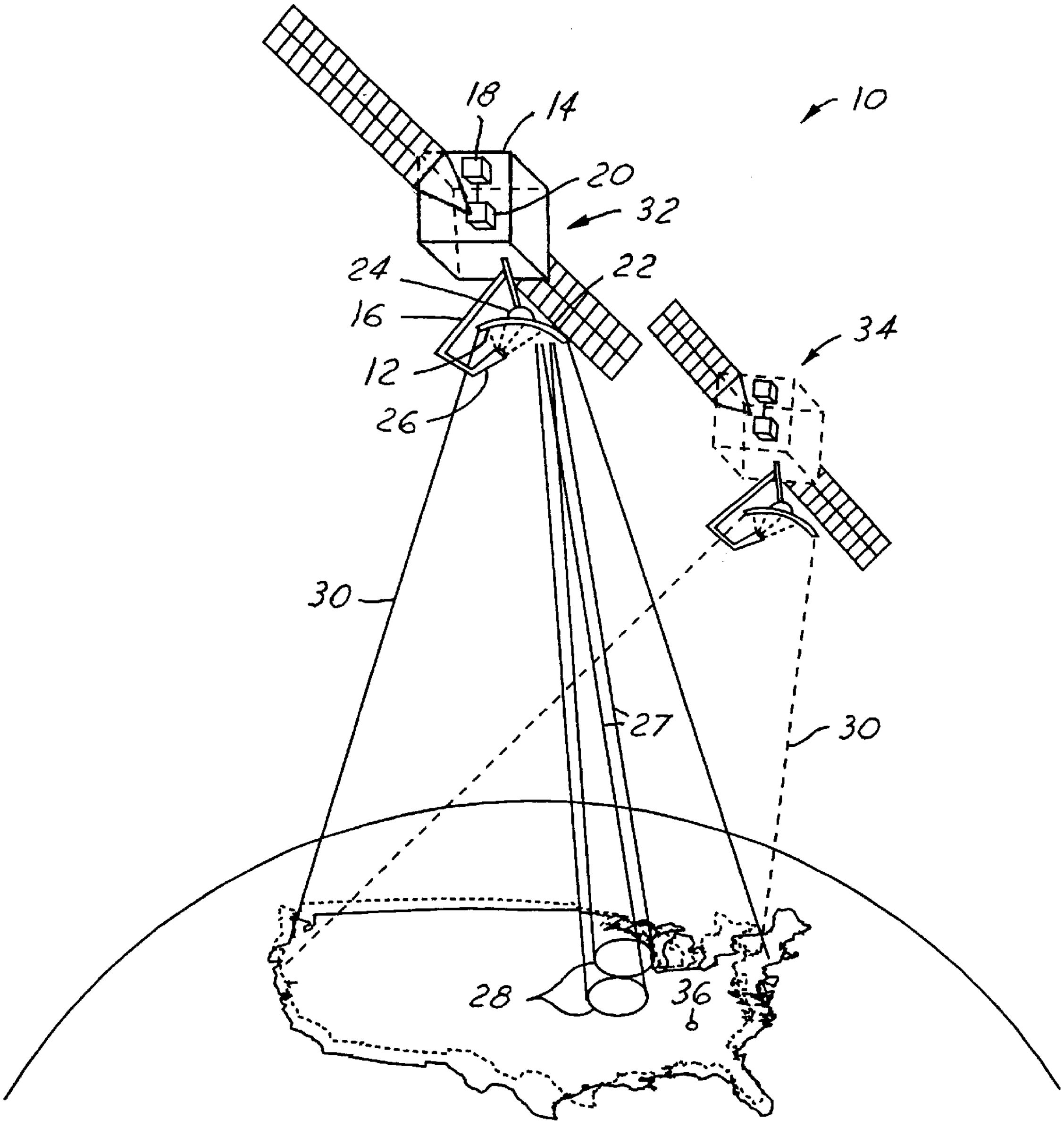
FIG. 1 is a perspective view of a communication system utilizing a synthesized reflector surface in accordance with an embodiment of the present invention.

In the following description, various operating parameters and components are described for one constructed embodiment. These specific parameters and components are included as examples and are not meant to be limiting.

In each of the following figures, the same reference numerals are used to refer to the same components. While the present invention is described with respect to an apparatus and method for transmitting and receiving signals in multiple orbits and multiple geographical coverage areas using a single identical reflector, the present invention may be adapted to be used for various purposes including: a ground based terminal, a satellite, a stratospheric platform, a spacecraft, or any other communication device that uses antenna reflectors.

The present invention may also be used for various services including; direct-to-home service, broadcast satellite service, fixed satellite service, Internet service, and other communication services. The present invention may also be used for various different frequency bands and various different missions such as Internet in vehicles and Internet in the air to business and residential building.

Referring now to FIG. 1, a perspective view of a communication system 10 utilizing a synthesized reflector surface 12 in accordance with an embodiment of the present invention is shown. The system 10 includes a satellite payload 14 having an antenna assembly 16, a spacecraft-steering mechanism 18, and a controller 20.

The antenna assembly 16 includes an antenna 22 having the reflector surface 12, a gimbaled mechanism 24, and a feedhorn 26. The reflector surface 12 allows transmission of communication signals 27 to various regions of coverage 28 having different directivity, and link availability. Communication signals 27 are transmitted via the antenna 22 to a first coverage area 30 from a first satellite orbit location 32, within a first orbital slot, and using the same reflector surface 12 communication signals may be transmitted to the same coverage area 30 from a second satellite orbit location 34, within a second orbital slot. The gimbaled mechanism 24 is used to individually adjust tracking sight locations for each orbit slot (elevation and azimuth angles). The feedhorn directs and signal conditions the communication signals between the antenna 22 and the satellite payload 14. Although the present invention is illustrated as being used in different location corresponding to different orbital slots, the satellite orbit locations may be other locations other than orbital in relation as in earth station locations.

Controller 20 is preferably a microprocessor based controller such as a computer having a central processing unit, memory (RAM and/or ROM), and associated input and output buses. The controller 20 adjusts the attitude of the system 10 by signaling the steering mechanism 18 to adjust pitch and roll positioning angles of the system 10. The controller 20 also adjusts the position of the reflector 12 by signaling the gimbaled mechanism 24 to adjust the position of the reflector surface 12. The controller 20 further determines the appropriate system configuration that is applicable for a mission either internally using onboard memory or externally from a single tracking site 36. Communication between the controller 20 and the tracking site 36 is performed using single beacon tracking via the reflector surface 12 or a separate omni antenna (not shown) from both the first orbital slot and the second orbital slot.

Figure 2A:
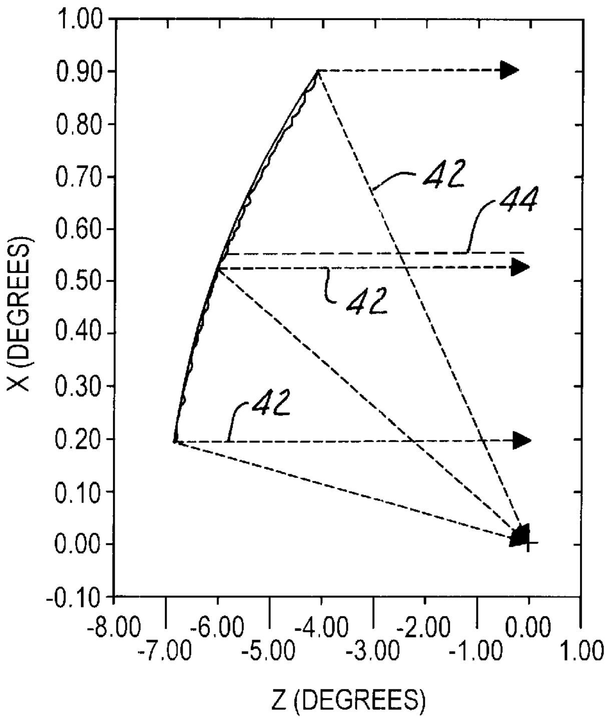
FIG. 2A is a graph illustrating a geometrical side-view of the synthesized reflector surface in accordance with an embodiment of the present invention.
Figure 2B:
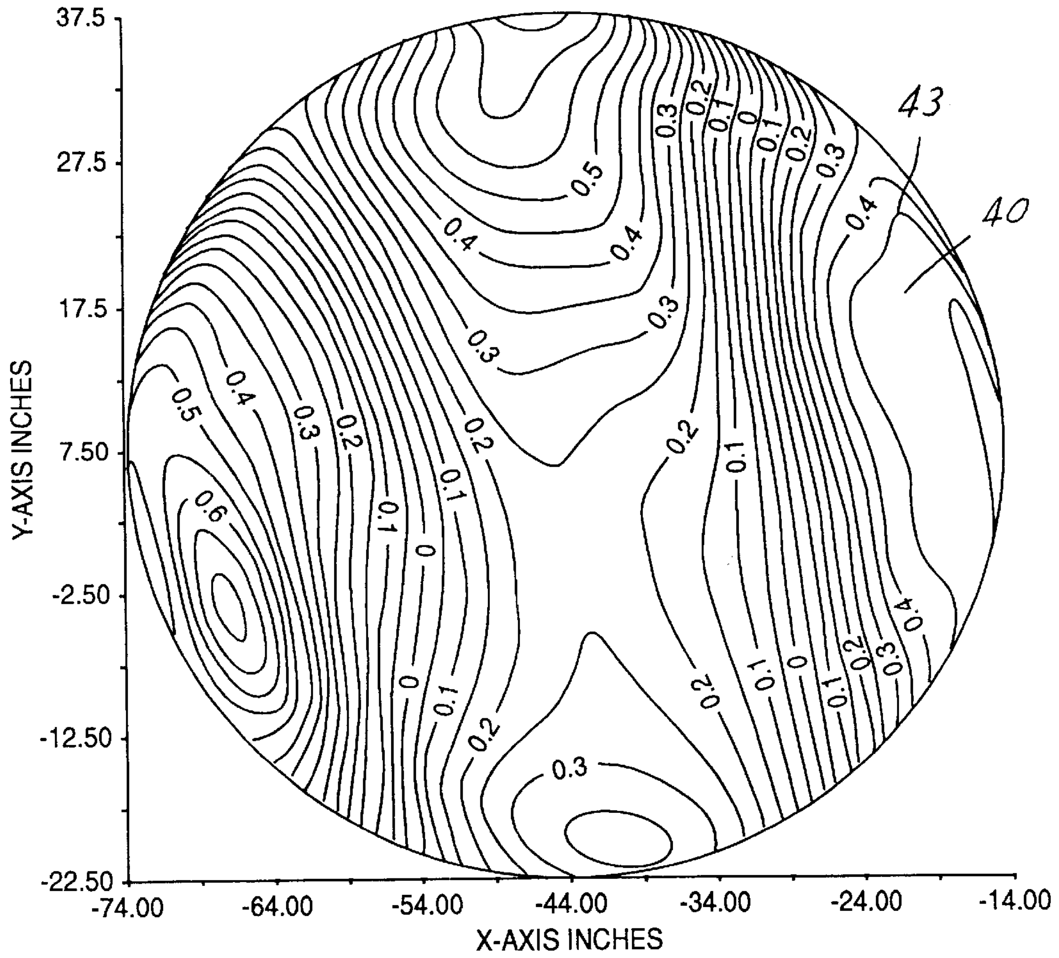
FIG. 2B is a graph illustrating a geometrical front-view of the synthesized reflector surface in accordance with an embodiment of the present invention.

Referring now to FIGS. 2A and 2B, graphs illustrating a geometrical side-view and front-view of the reflector surface 12 in accordance with an embodiment of the present invention are shown. The reflector surface 12 is irregularly shaped containing a plurality of profile surfaces 40. The plurality of profile surfaces 40 alters the phase of transmitted communication signals and in doing so change the gain of the signals as to accommodate the gain requirements for a particular region of coverage. Different regions of coverage have varying rainfall. Therefore different gain requirements exist for each region of coverage as to overcome rain-fade due to transmission of signals through the rainfall in those regions. The plurality of profile surfaces 40 represent deviations in inches from an ideal parabolic surface. A computer software simulation tool, such as a physical optical synthesis from TICRA corporation, which is commercially available is used to determine the shape of the surface that is applicable for an orbital slot, a coverage area, and gain, directivity, and link availability requirements. Curves 43, having corresponding values, represent deviations from an ideal parabolic surface. The dotted lines 42 represent signal reflection to and from the reflector surface 12. The dashed line 44 corresponds to the center of the reflector surface 12.

Figure 3:
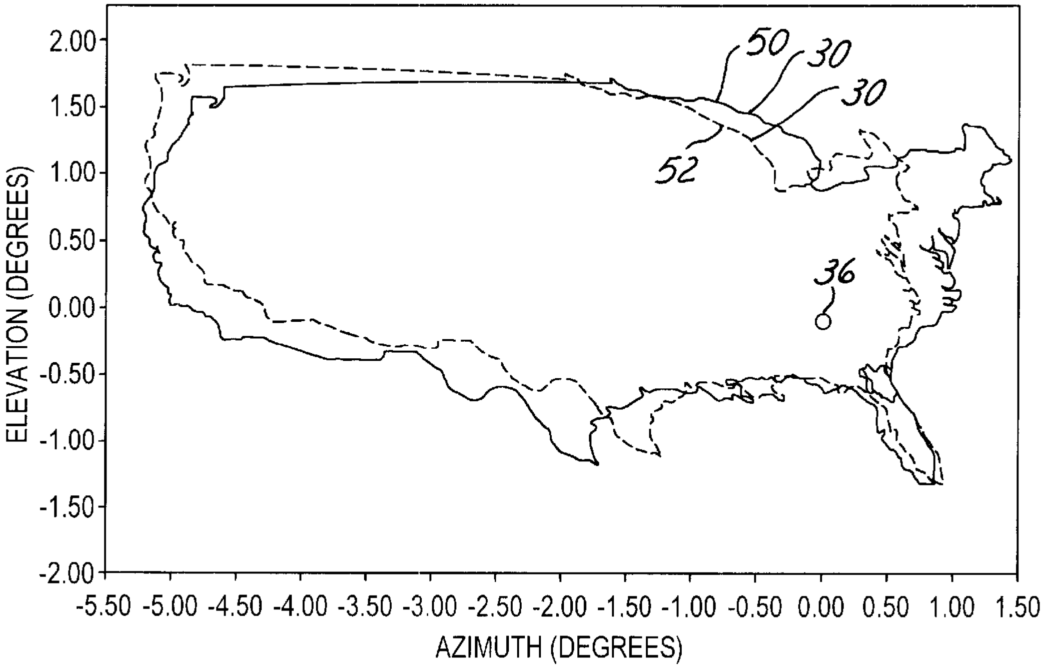
FIG. 3 is a graph illustrating the same coverage area for two different orbital slots for the communication system according to an embodiment of the present invention.

Referring now to FIG. 3, a graph illustrating the same coverage area for two different orbital slots for the payload 14 according to an embodiment of the present invention is shown. Payload 14 is capable of transmitting signals to an identical coverage area, such as the contiguous United States (CONUS), from multiple Aorbital slots using the same reflector surface 12. The solid lined plot 50 represents a primary mission and the dashed lined plot 52 represents a secondary mission with the payload 14 in a 101θW first orbital slot and a 119θW second orbital slot respectively. The first orbital slot and the second orbital slot of 101θW and 119θW are used for example purposes, other orbital slots may be used. The payload 14 is biasly positioned away from the primary location and position to a secondary location and position when in the second orbital slot as to remain in communication with the tracking site 36. The position of the payload 14 or the reflector surface 12 refers to their orientation in a particular location. Note the use of the payload 14 of the present invention, allows the use of only one antenna having one reflector surface and in communication with one tracking site. Thereby, minimizing components and costs involved in implementation of the communication system 10.

Figure 4A:
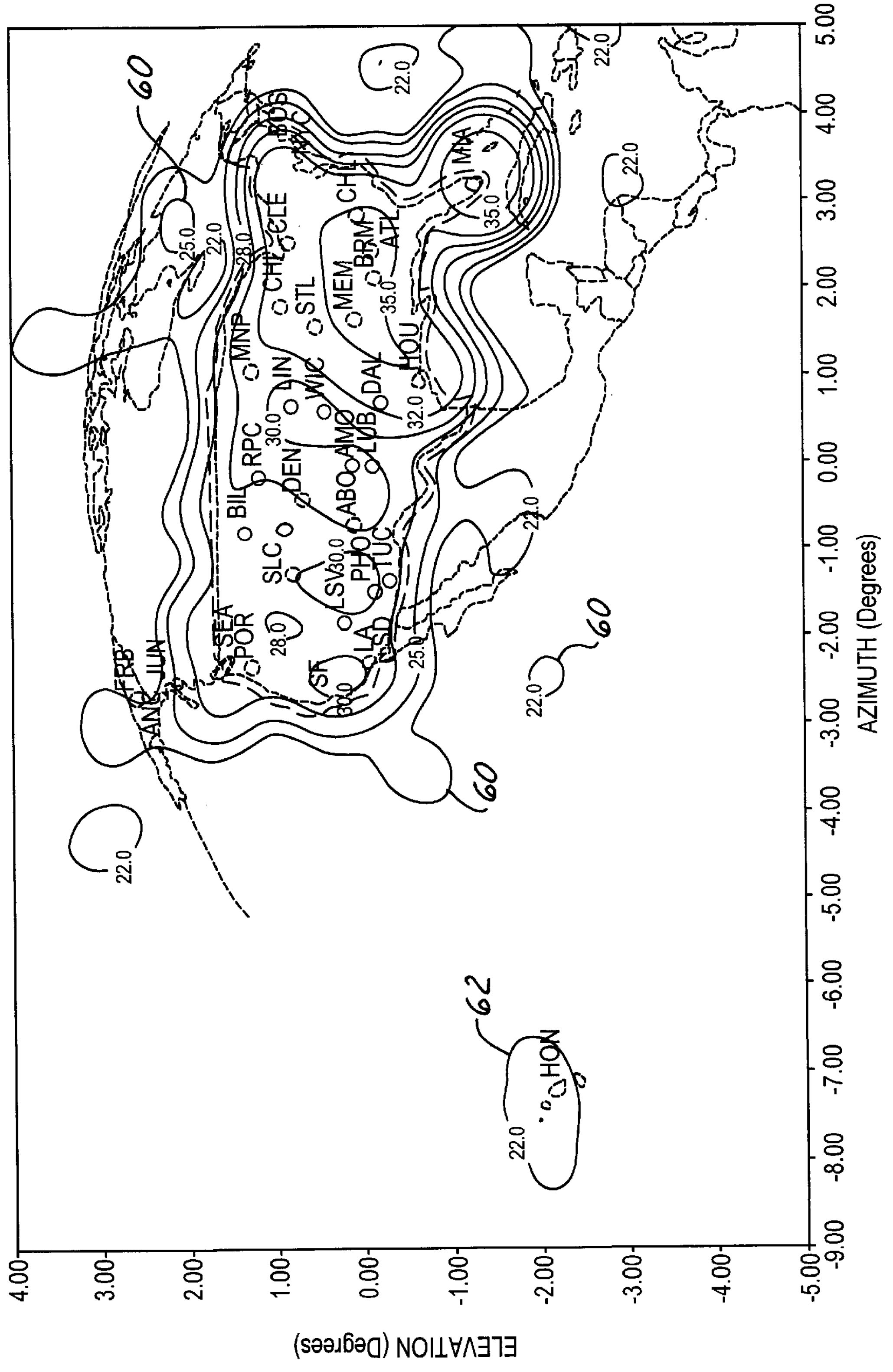
FIG. 4A is a graph of the predicted directivity contours for the synthesized reflector surface operating in a first orbital slot according to an embodiment of the present invention.
Figure 4B:
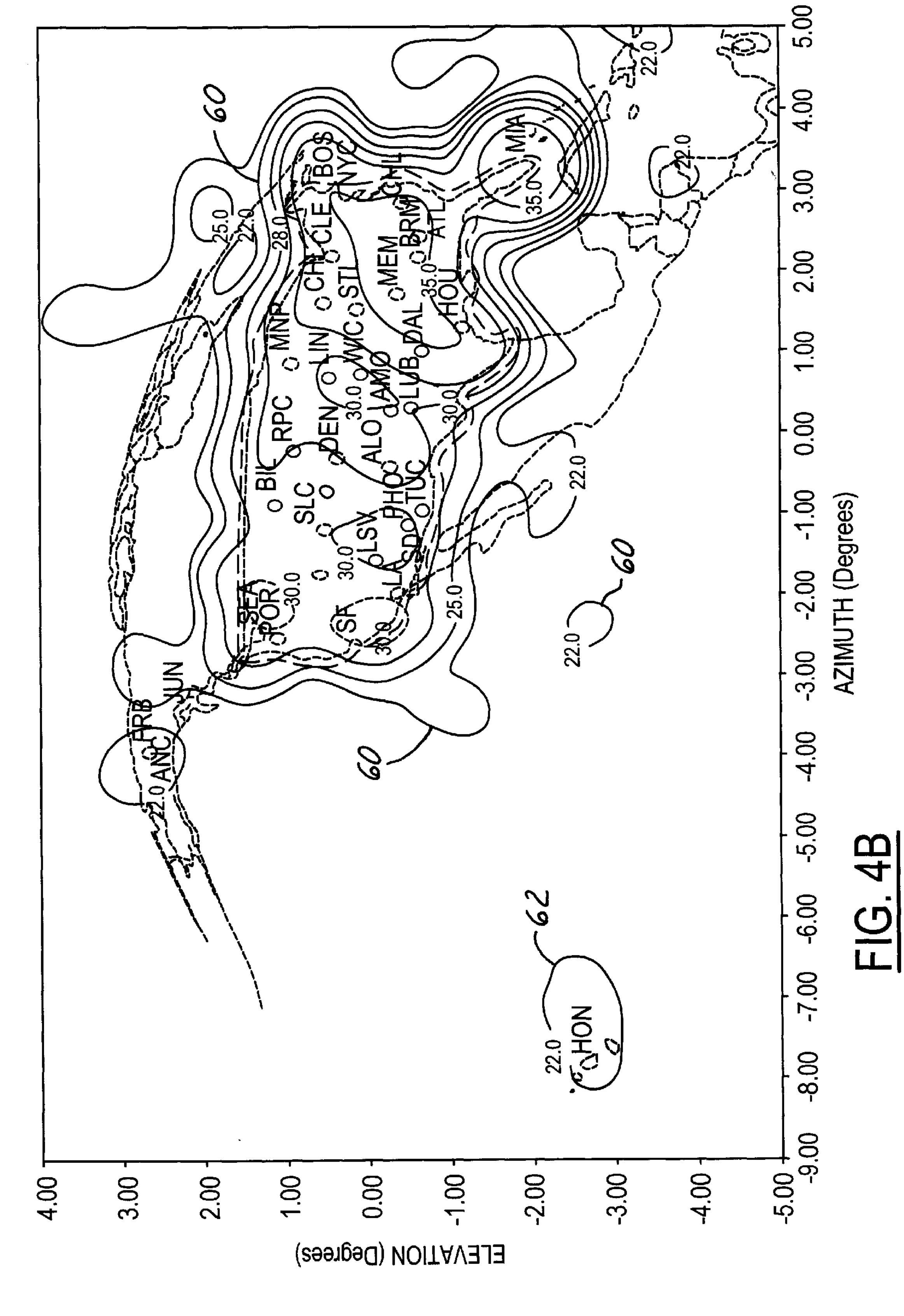
FIG. 4B is a graph of the predicted directivity contours for the synthesized reflector surface operating in a second orbital slot according to an embodiment of the present invention.

Referring now to FIGS. 4A and 4B, graphs of predicted directivity contours 60 for the reflector surface 12 operating in a first orbital slot and a second orbital slot according to an embodiment of the present invention are shown respectively. The predicted directivity contours 60 may be established using commercially available computer software as stated above. The contours 60 have representation contour values, which are directly related to the gain and isolation of desired communication signals after differentiating them from cross-polarization interference. The larger a representative contour value the stronger the signal inside of that contour. For example, contour 62 has a representative contour value of 22.0 dBi corresponding to the gain of the region over Honolulu, Hi. within the contour 62. The largest representative contour values are over CONUS and the regional areas corresponding to link availability requirements mentioned above.

Figure 5A:
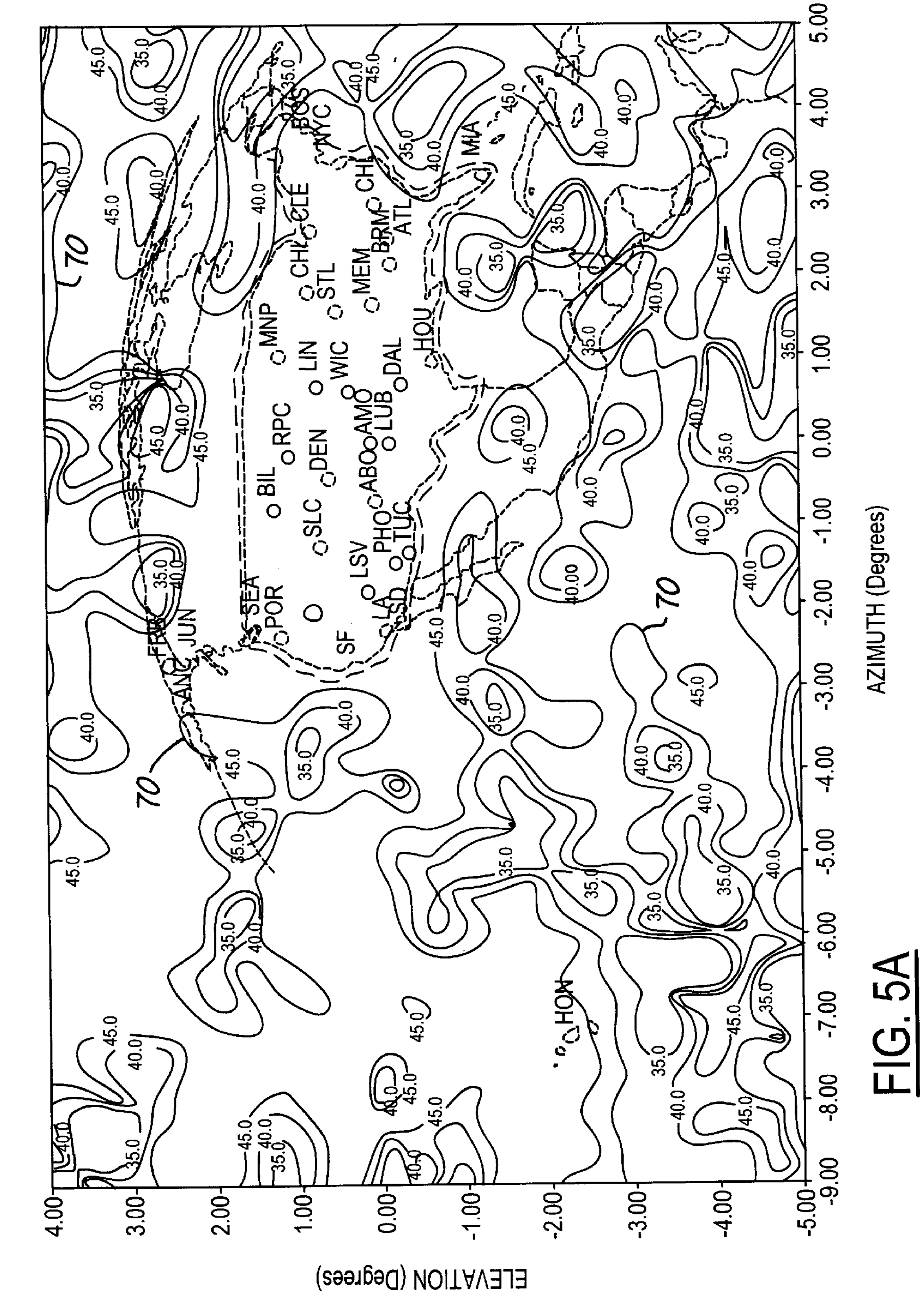
FIG. 5A is a graph of cross-polarization contours for the synthesized reflector surface operating in the first orbital slot according to an embodiment of the present invention.
Figure 5B:
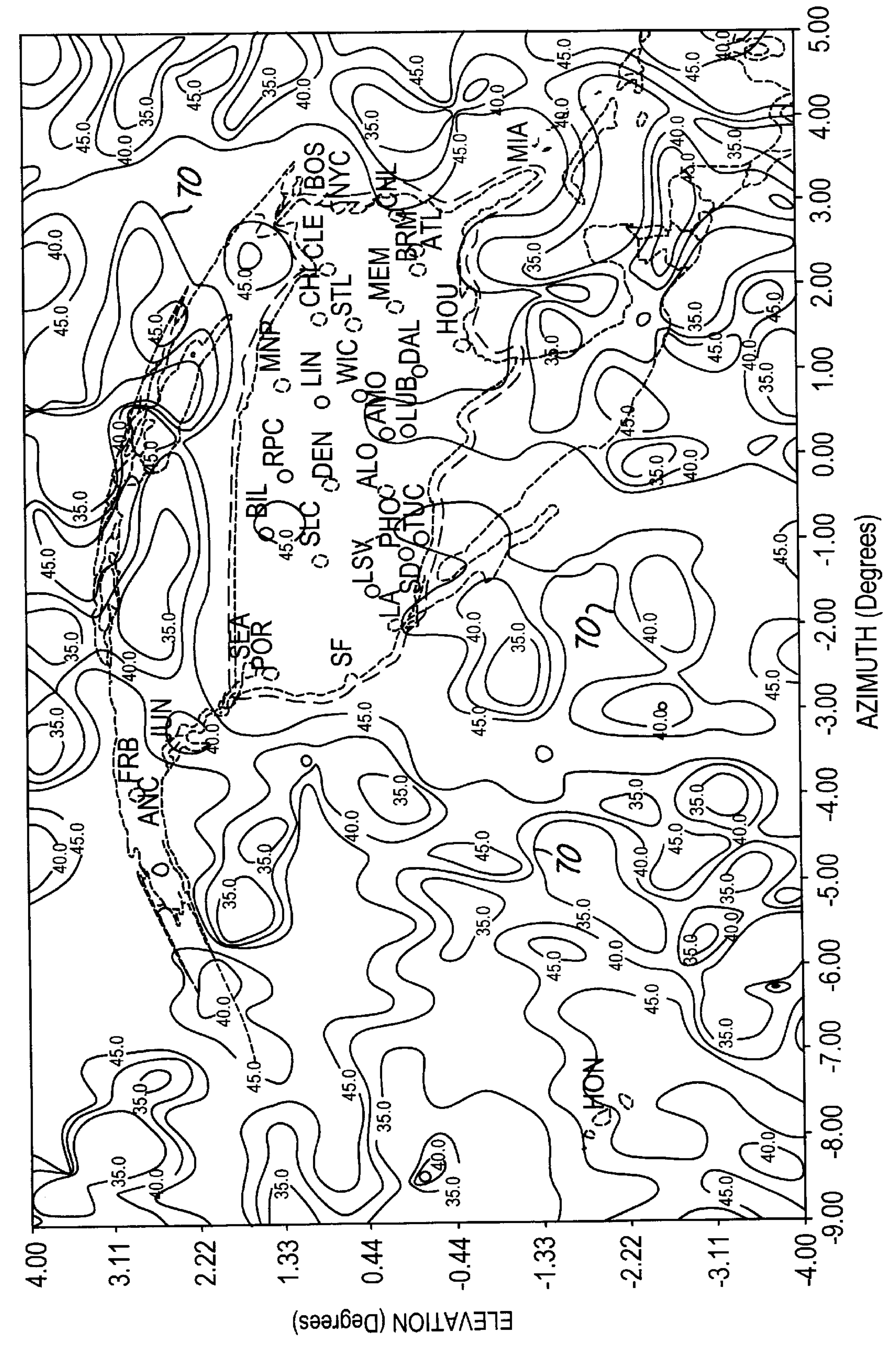
FIG. 5B is a graph of cross-polarization contours for the synthesized reflector surface operating in the second orbital slot according to an embodiment of the present invention.

Referring now to FIGS. 5A and 5B, graphs of cross-polarization isolation contours 70 for the reflector surface 12 operating in the first orbital slot and a second orbital slot according to an embodiment of the present invention are shown respectively. The values corresponding to the contours 70 represent the level of cross-polarized signal relative to co-polarized signal in db. Cross-polarization may occur because of the following interference patterns; cross-polarization between left and right feedhorn generated signals, cross-polarization interference between communication signals from different satellites, and cross-polarization discrimination from ground based terminal antenna. The larger a cross-polarization representative contour value the lower the cross-polarization for an area within that contour. For example the cross-polarization for most of CONUS except a portion of the northeast and east coast is 45.0, which corresponds to low cross-polarization.

The examples shown in FIGS. 4A, 4B, 5A, and 5B are examples of the reflector surface 12 being used in a direct-to-home service transmitting communication signals at Ku-band frequency levels. Of course, when other services and frequency levels are used different co-polarization and cross-polarization representation contours may apply.

Figure 6:
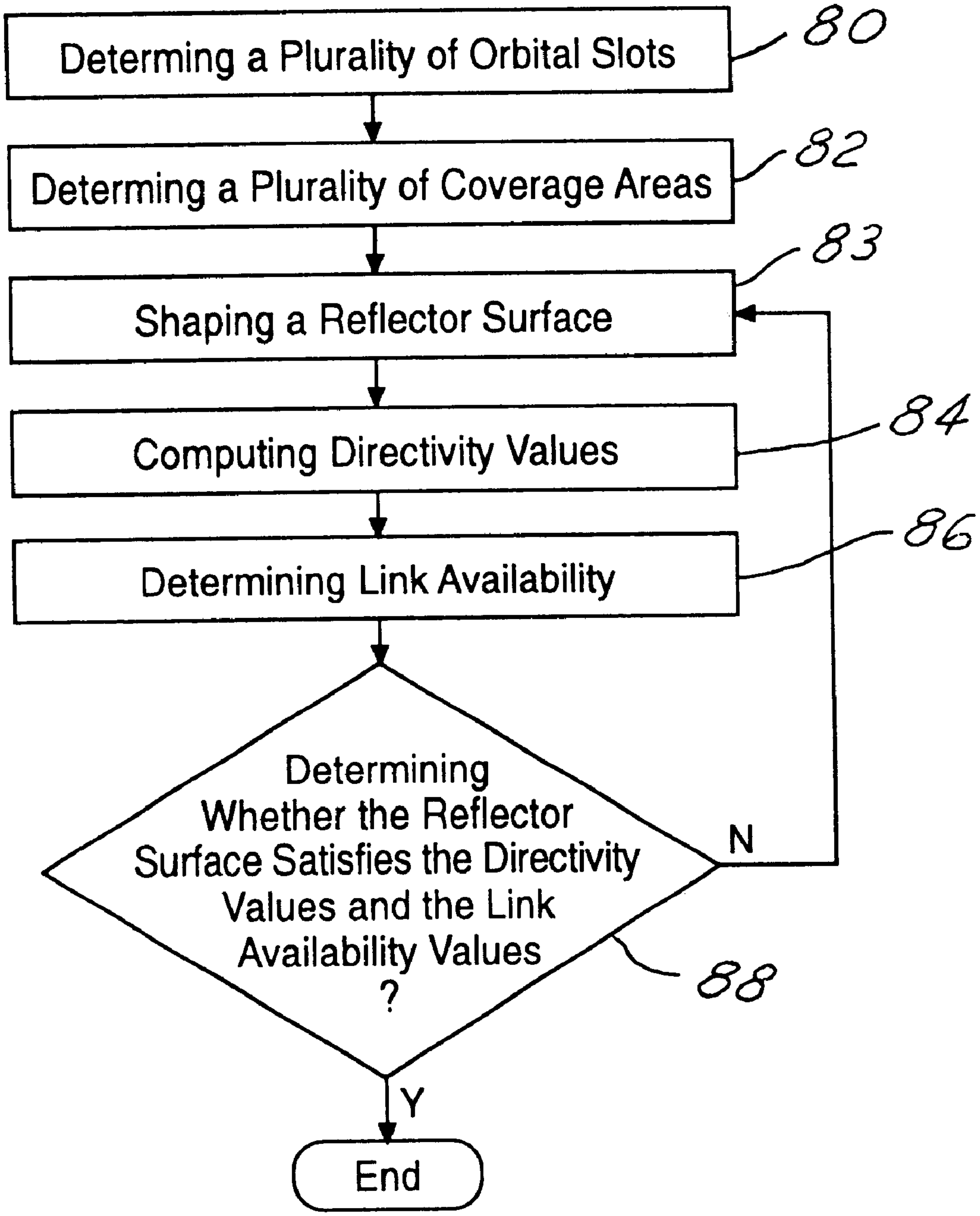
FIG. 6 is a flow chart illustrating a method of synthesizing the reflector surface according an embodiment of the present invention.

FIG. 6 is a flow chart illustrating a method of synthesizing the reflector surface 12 according to an embodiment of the present invention.

In step 80, orbital slots that the reflector surface 12 may be used in are determined. The orbital slot that the reflector surface 12 is primarily used in is determined, and is referred to as part of the primary mission of the payload 14. Other orbital slots are also determined and are considered as part of a secondary mission, for the fact that the reflector surface 12 will potentially be used less in the secondary orbital slots versus the primary orbital slot.

In step 82, the coverage area(s) that the reflector surface 12 may be used for are determined. Although, the reflector surface 12 of the present invention is intended to be used in multiple orbital slots and cover the same coverage area it may be designed to cover multiple coverage areas.

In step 83, the synthesized reflector surface is shaped in response to the plurality of orbital slots and the plurality of coverage areas. The shape of the reflector surface is created as to maximize co-polarization of transmitted communication signals and to minimize cross-polarization for the determined orbital slots and determined coverage area. The maximization of desired co-polarization and minimization of cross-polarization is an iterative process performed using the above mentioned software and further described below in configuring the satellite system 10.

In step 84, directivity values 60 are computed in response to the determined orbital slots and coverage area. The directivity values 60 correspond to the magnitude and direction of the transmitted signals.

In step 86, link availability is determined for the determined orbital slots and the determined coverage area in response to said computed directivity values. Tables 1 and 2 show link availability for the 101θW and 109θW orbital slots respectively.

TABLE 1

| City | State | Crane Rain Zone | Req EIRP QPSK 99.85% | DS-7 EIRP 101° | Delta EIRP 101° QPSK 99.85% | Pred. Avail 101° QPSK | Clear Sky Margin 101° |
|---|---|---|---|---|---|---|---|
| Albuquerque | New Mexico | F | 49.68 | 51.10 | 1.42 | 99.98 | 3.3 |
| Amarillo | Texas | D1 | 49.86 | 52.06 | 2.20 | 99.95 | 4.1 |
| Anchorage | Alaska | B | 42.49 | 42.87 | 0.38 | 99.87 | 3.4 |
| Atlanta | Georgia | D3 | 54.42 | 57.24 | 2.82 | 99.94 | 6.2 |
| Billings | Montana | B2 | 49.12 | 50.76 | 1.64 | 99.96 | 2.9 |
| Birmingham | Alabama | E | 56.89 | 56.92 | 0.03 | 99.85 | 6.3 |
| Boston | Massachusetts | D2 | 53.10 | 53.16 | 0.06 | 99.85 | 3.8 |
| Charlotte | North Carolina | D3 | 54.56 | 56.50 | 1.94 | 99.92 | 5.7 |
| Chicago | Illinois | D2 | 54.00 | 54.26 | 2.26 | 99.93 | 5.1 |
| Denver | Colorado | B2 | 50.17 | 50.72 | 0.55 | 99.96 | 2.5 |
| El Paso | Texas | F | 48.30 | 50.21 | 0.91 | 99.95 | 2.1 |
| Honolulu | Hawaii | C | 44.09 | 44.10 | 0.01 | 99.85 | 4.5 |
| Houston | Texas | D3 | 54.30 | 55.76 | 1.46 | 99.91 | 5.4 |
| Las Vegas | Nevada | F | 48.28 | 50.75 | 2.47 | 99.96 | 3.8 |
| Little Rock | Arkansas | D3 | 54.18 | 56.23 | 2.05 | 99.92 | 5.9 |
| Los Angeles | California | F | 50.52 | 50.88 | 0.36 | 99.93 | 2.3 |

TABLE 1-continued

| City | State | Crane Rain Zone | Req EIRP QPSK 99.85% | DS-7 EIRP 101° | Delta EIRP 101° QPSK 99.85% | Pred. Avail 101° QPSK | Clear Sky Margin 101° |
|---|---|---|---|---|---|---|---|
| Lubbock | Texas | F | 49.50 | 51.45 | 1.95 | 99.97 | 2.9 |
| Miami | Florida | E | 57.64 | 58.93 | 1.29 | 99.88 | 7.5 |
| Minneapolis | Minnesota | D1 | 50.52 | 52.00 | 1.48 | 99.93 | 3.5 |
| Minot | North Dakota | C | 49.90 | 50.76 | 0.86 | 99.92 | 2.4 |
| New York | New York | D2 | 53.06 | 54.38 | 1.32 | 99.92 | 4.7 |
| Phoenix | Arizona | F | 50.17 | 51.22 | 1.05 | 99.93 | 2.1 |
| Rapid City | South Dakota | D1 | 50.13 | 51.21 | 1.08 | 99.91 | 3.5 |
| Salt Lake City | Utah | F | 50.16 | 51.10 | 0.94 | 99.95 | 2.8 |
| San Antonio | Texas | D2 | 52.00 | 52.06 | 0.06 | 99.85 | 3.3 |
| San Francisco | California | C | 50.45 | 50.70 | 0.25 | 99.87 | 2.4 |
| Seattle | Washington | C | 50.52 | 51.19 | 0.67 | 99.92 | 2.6 |
| Spokane | Washington | B1 | 50.04 | 50.38 | 0.34 | 99.93 | 2.3 |
| Tucson | Arizona | F | 49.23 | 50.30 | 1.07 | 99.93 | 2.3 |

TABLE 2

| City | State | Crane Rain Zone | Req EIRP QPSK 99.85% | DS-7 EIRP 119° | Delta EIRP 119° QPSK 99.85% | Pred. Avail 119° QPSK | Clear Sky Margin 119° |
|---|---|---|---|---|---|---|---|
| Albuquerque | New Mexico | F | 51.98 | 53.36 | 1.38 | 99.96 | 2.2 |
| Amarillo | Texas | D1 | 52.86 | 52.91 | 0.05 | 99.85 | 2.5 |
| Anchorage | Alaska | B | 43.65 | 44.65 | 1.00 | 99.90 | 2.4 |
| Atlanta | Georgia | D3 | 57.87 | 58.63 | 0.76 | 99.87 | 4.7 |
| Billings | Montana | B2 | 51.31 | 52.28 | 0.97 | 99.93 | 2.0 |
| Birmingham | Alabama | E | 61.21 | 58.46 | −2.75 | 99.74 | 4.7 |
| Boston | Massachusetts | D2 | 57.43 | 57.56 | 0.13 | 99.85 | 4.3 |
| Charlotte | North Carolina | D3 | 58.34 | 58.50 | 0.16 | 99.85 | 4.6 |
| Chicago | Illinois | D2 | 55.28 | 55.62 | 0.34 | 99.86 | 3.7 |
| Denver | Colorado | B2 | 51.19 | 52.10 | 0.91 | 99.93 | 2.0 |
| El Paso | Texas | F | 52.58 | 52.69 | 0.11 | 99.87 | 1.0 |
| Honolulu | Hawaii | C | 44.92 | 45.29 | 0.37 | 99.87 | 3.0 |
| Houston | Texas | D3 | 57.42 | 57.63 | 0.21 | 99.85 | 4.5 |
| Las Vegas | Nevada | F | 51.71 | 52.61 | 0.90 | 99.93 | 2.1 |
| Little Rock | Arkansas | D3 | 58.03 | 58.22 | 0.19 | 99.86 | 4.0 |
| Los Angeles | California | F | 51.88 | 52.55 | 0.67 | 99.92 | 2.3 |
| Lubbock | Texas | F | 50.95 | 52.72 | 1.77 | 99.95 | 2.4 |
| Miami | Florida | E | 62.46 | 60.74 | −1.72 | 99.76 | 5.2 |
| Minneapolis | Minnesota | D1 | 53.23 | 53.42 | 0.19 | 99.86 | 2.6 |
| Minot | North Dakota | C | 51.70 | 52.37 | 0.67 | 99.89 | 2.0 |
| New York | New York | D2 | 57.08 | 57.72 | 0.64 | 99.87 | 4.4 |
| Phoenix | Arizona | F | 51.13 | 53.06 | 1.93 | 99.94 | 2.6 |
| Rapid City | South Dakota | D1 | 51.90 | 52.59 | 0.69 | 99.89 | 2.2 |
| Salt Lake City | Utah | F | 50.81 | 52.43 | 1.62 | 99.96 | 2.2 |
| San Antonio | Texas | D2 | 54.85 | 56.92 | 2.07 | 99.92 | 4.3 |
| San Francisco | California | C | 52.30 | 52.52 | 0.22 | 99.86 | 2.2 |
| Seattle | Washington | C | 51.96 | 52.33 | 0.37 | 99.87 | 2.0 |
| Spokane | Washington | B1 | 51.48 | 52.79 | 1.31 | 99.94 | 2.0 |
| Tucson | Arizona | F | 51.70 | 52.10 | 0.40 | 99.90 | 1.4 |

Each region of coverage or city has a Crane rain zone value representing the rain-fade in that area. Each table shows equivalent isotropic radiated power (EIRP) required and achieved for that area, in columns 4 and 5. Column 6 contains the difference between the required and actual EIRP value. Note the difference values are all positive, meaning that the reflector satisfies that requirement. The tables 1 and 2 also show in columns 7 and 8 predicted link availability for quadrature phased shift key (QPSK) modulation and clear sky margin values, respectively. A link availability value of 99.8 corresponds to a service being available 99.98% of the time in that region of coverage. As with the difference values for EIRP, positive values for clear sky margin means the reflector surface 12 also satisfies that requirement. The reflective surface 12 by taking into account the link availability improves cross-polarization isolation by accounting for rain-fade, slant range, and cross-polarization discrimination.

In step 88, the system 10 determines whether the directivity values and the link availability requirements are satisfied for the reflector surface 12. When the directivity values and the link availability requirements have been satisfied the reflector surface 12 is ready to be used and the method is ended. Otherwise, the system 10 returns to step 83 so as to modify the reflector surface 12 or synthesize another reflector surface.

Figure 7:
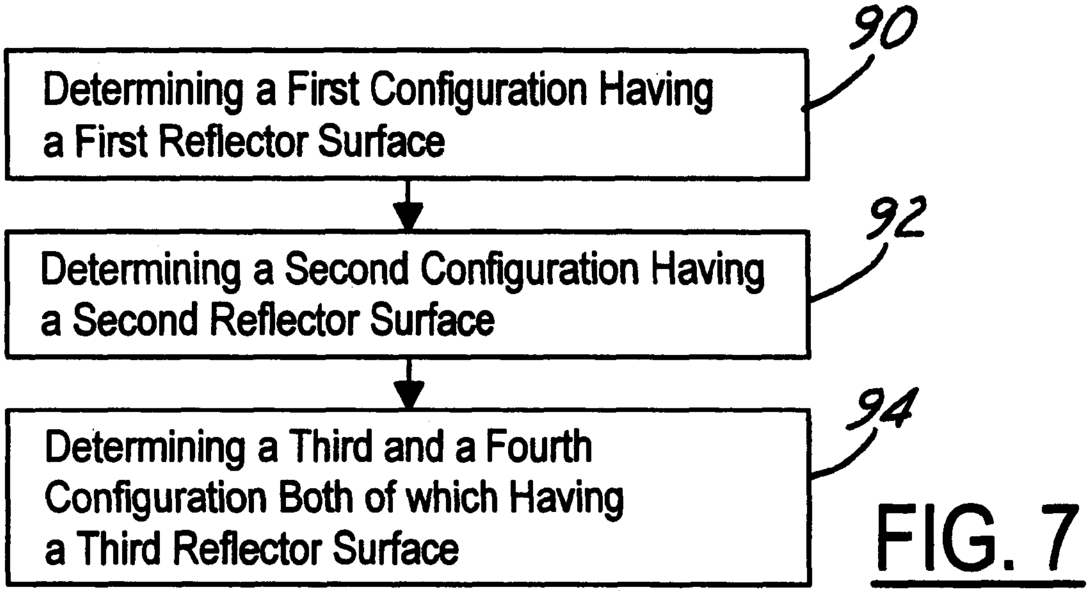
FIG. 7 is a flow chart illustrating a method of configuring the satellite system according to an embodiment of the present invention.

FIG. 7 is a flow chart illustrating a method of configuring the satellite system 10 according to an embodiment of the present invention.

In step 90, a first configuration is determined for the primary mission including a first orientation and a corresponding first reflector surface shape is determined. The first reflector surface is shaped in combination with determining a first satellite orbit location and position to maximize desired communication signal transmission for the first orbital slot and the coverage area 30 using known methods.

In step 92, a second configuration is determined for the secondary mission including a second orientation and a corresponding second reflector surface shape is determined. As with the primary mission the second reflector surface is shaped in combination with determining a second satellite orbit location and position to maximize desired communication signal transmission for the second orbital slot and the coverage area.

In step 94, a third and fourth configuration is determined for the primary and secondary missions respectively, including a third and a fourth orientation, using a third reflector surface. Configuration difference values are determined by comparing said first configuration with said second configuration. The third reflector surface shape is determined by iteratively adjusting the first reflector shape and the second reflector shape, using the configuration difference values, as to create a shape that satisfies the link availability for both the primary and the secondary missions. During iteratively adjusting the shape of the reflector surface the reflector orientations are also iteratively adjusted. The requirements for the primary mission may be weighed more heavily than those of the secondary mission when so desired as to greater maximize signal transmission for the primary mission.

When more than one orbital slot is desired for the secondary mission the above-described iterative process is performed with the additional orbital slots being weighted accordingly.

A satellite system utilizing the synthesized reflector surface of the present invention provides a satellite system that may be used in multiple orbits to cover the same coverage area, thereby reducing the number of antenna components normally necessary for multiple orbital slots. This not only reduces production costs but also provides greater versatility for an individual satellite system. The present invention in that it uses existing tools that are commercially available is easily implementable with reasonably minimal costs. The present invention is interference limited as to better provide signal transmission in various orbits for various services to the same coverage area.

The above-described apparatus, to one skilled in the art, is capable of being adapted for various purposes and is not limited to the following applications: a ground based terminal, a satellite, a stratospheric platform, a spacecraft, or any other communication device that uses antenna reflectors. The above-described invention may also be varied without deviating from the spirit and scope of the invention as contemplated by the following claims.

What is claimed is:

1. A synthesized reflector surface for directing communication signals in a communication system that operates in a plurality of orbital slots and to a plurality of regions within a first coverage area comprising:

a plurality of contiguous profile surfaces forming the reflector surface, each of said plurality of contiguous profile surfaces altering the phase of the communication signals to provide a first gain for a first satellite orbit location and a second gain for a second satellite orbit location;

wherein said plurality of contiguous profile surfaces directs said signals from the first satellite orbit location in a first orientation to the first coverage area or from said second satellite orbit location in a second orientation to the first coverage area.

2. A reflector surface as in claim 1 wherein said plurality of contiguous profile surfaces directs said signals from a first orbital slot in a first orientation or from a second orbital slot in a second orientation to a first coverage area.

3. A reflector surface as in claim 1 wherein the plurality of contiguous profile surfaces in an orientation of a plurality of orientations transmits communication signals from a plurality of orbital slots to said first coverage area.

4. A reflector surface as in claim 1 wherein the plurality of contiguous profile surfaces transmits signals, using said plurality of profile surfaces, from within an orbital slot to multiple regions of coverage.

5. A reflector as in claim 1 wherein the gain of said plurality of contiguous profile surfaces varies according to rain-fade requirements that are associated with a plurality of regions of coverage.

6. A reflector as in claim 1 wherein the gain of said plurality of contiguous profile surfaces varies according to slant range of the synthesized reflector in a plurality of orbital slots for said first coverage area.

7. A reflector as in claim 1 wherein a first profile surface provides a first gain for a first coverage area and a second profile surface provides a second gain for said first coverage area.

8. A reflector as in claim 1 wherein said plurality of contiguous profile surfaces provide a first plurality of gains for a first coverage area and a second plurality of gains for a second coverage area.

9. A satellite system comprising:

an antenna comprising:

a synthesized reflector surface comprising:

a plurality of contiguous profile surfaces, each of said profile surfaces altering the phase of transmitted communication signals as to provide a gain for an orbital slot;

a spacecraft-steering mechanism coupled to the satellite system;

a gimball mechanism coupled to said antenna; and a controller electrically coupled to said spacecraft-steering mechanism and said gimball mechanism, said controller adjusting pitch and roll positioning angles of the satellite system and adjusting positioning of said antenna as to transmit signals, using a profile surface from said plurality of contiguous profile surfaces, from a first location in a first orbital slot or from a second orbital slot in a second orientation to a first coverage area.

10. A reflector as in claim 9 wherein the gain of said plurality of contiguous profile surfaces varies according to rain-fade requirements that are associated with a plurality of regions of coverage.

11. A reflector as in claim 9 wherein the gain of said plurality of contiguous profile surfaces varies according to slant range of the synthesized reflector in a plurality of orbital slots for said first coverage area.

12. A method of synthesizing a reflector surface comprising:

determining a plurality of orbital slots;

determining plurality of coverage area(s) for said plurality of orbital slots;

shaping the reflector surface in response to said plurality of orbital slots and said plurality of coverage area(s) such that the reflector surface transmits communication signals to a first coverage area from one or more of said plurality of orbital slots;

computing directivity values of communication signals for said plurality of orbital slots and said plurality of coverage area(s);

determining link availability for said plurality of orbital slots and said plurality of coverage area(s) in response to said computed directivity values; and determining whether said directivity values and said link availability have been satisfied in said shaped reflector surface.

13. A method as in claim 12 wherein shaping the reflector surface comprises iteratively modifying the reflector surface until all desired link availability requirements are achieved.

14. A method as in claim 12 wherein shaping the reflector surface comprises using a software program to determine the size, shape, material, and profile surface arrangement of the reflector.

15. A method of configuring a satellite system having an antenna with a single synthesized reflector, the method comprising:

determining a first configuration for a primary mission having a first reflector surface;

determining a second configuration for a secondary mission having a second reflector surface; and determining a third configuration and a fourth configuration, both of which having a third reflector surface, in response to said first configuration and said second configuration to provide directivity values and link availability for both said primary mission and said secondary mission respectively.

16. A method as in claim 15 wherein determining a first configuration comprises:

determining a primary satellite location and position such that said satellite system is in communication with a sub-satellite point;

calculating a first set of directivity values for a first orbital slot and a first coverage area;

determining first link availability for said primary mission; and determining a first reflector surface, a steering position, and pitch and roll positioning angles in response to said first directivity values and said first link availability.

17. A method as in claim 16 wherein determining a second configuration comprises:

determining a secondary satellite location and position such that said satellite system is in communication with said sub-satellite point;

calculating second directivity values for a second orbital slot and a first coverage area;

determining second link availability for said secondary mission; and determining a second reflector surface, a steering position, and pitch and roll positioning angles in response to said second directivity values and said second link availability.

18. A method as in claim 17 wherein determining a third configuration and a fourth configuration comprises:

comparing said first configuration with said second configuration to establish configuration difference values; and determining the synthesized reflector shape, the pitch and roll positioning angles, and the steering positions to provide directivity values and link availability for said primary mission and said secondary mission.

19. A method as in claim 18 wherein determining a third configuration and a fourth configuration further comprises adjusting said first configuration and said second configuration as to provide directivity values and link availability for said primary mission and said secondary mission.

20. A method as in claim 15 wherein said secondary mission comprises a plurality of orbital slots.

* * * * *